United States Patent

Balukin et al.

[19]

[11] Patent Number: 6,067,485
[45] Date of Patent: May 23, 2000

[54] METHOD OF CONTROLLING 20 PIPE PRESSURE

[75] Inventors: Gregory S. Balukin, Pittsburgh, Pa.; Paul J. Kettle, Jr., Ijamsville, Md.; David J. Pcsolar, Irwin, Pa.

[73] Assignee: Westinghouse Air Brake Company, Wilmerding, Pa.

[21] Appl. No.: 09/034,592

[22] Filed: Mar. 4, 1998

[51] Int. Cl.$^7$ .................................................. B60T 13/68
[52] U.S. Cl. ........................... 701/19; 246/182 B; 303/3; 303/15; 303/20; 701/70
[58] Field of Search ................................. 701/19, 36, 70, 701/78; 303/3, 14, 15, 20, 33, 70, 80, 81, 82, 86, DIG. 2, DIG. 3; 246/182 B, 182 R

[56] References Cited

U.S. PATENT DOCUMENTS

| | | | |
|---|---|---|---|
| 5,172,316 | 12/1992 | Root et al. ................................. | 701/70 |
| 5,369,587 | 11/1994 | Root et al. ................................. | 701/70 |
| 5,412,572 | 5/1995 | Root et al. ................................. | 701/70 |
| 5,590,042 | 12/1996 | Allen, Jr. et al. .......................... | 701/70 |
| 5,718,487 | 2/1998 | Roselli et al. .............................. | 303/14 |
| 5,721,683 | 2/1998 | Joyce, Jr. et al. ......................... | 701/70 |
| 5,927,823 | 7/1999 | Dimsa et al. ............................... | 303/86 |

*Primary Examiner*—William A. Cuchlinski, Jr.
*Assistant Examiner*—Edward Pipala
*Attorney, Agent, or Firm*—James Ray & Associates

[57] ABSTRACT

An improved method is used to control the pressure in the IAR pipe of a train. The train is typically equipped with an independent brake handle, a control reservoir, an IAR control portion and a computer for controlling the IAR control portion generally according to position of the brake handle. The method involves the steps of: moving the brake handle to a point along its range of motion; and storing in the computer as a setpoint the value desired for the pressure within the IAR pipe. At whichever point the brake handle occupies along its range of motion, there is a particular pressure setpoint corresponding thereto. The method next includes the steps of: directing the computer to modify the actual pressure in the control reservoir to the setpoint thereby also causing the actual IAR pipe pressure to approach the setpoint. As the actual IAR pipe pressure approaches the setpoint, the computer is directed to adjust the actual control reservoir pressure to a value slightly above (if desiring to increase IAR pipe pressure) or below (if desiring to decrease IAR pipe pressure) the setpoint until the actual IAR pipe pressure reaches the setpoint. While monitoring the actual IAR pipe pressure, the computer then adjusts the actual control reservoir pressure to maintain the actual IAR pipe pressure at the setpoint corresponding to the position of the independent brake handle.

19 Claims, 4 Drawing Sheets

METHOD OF CONTROLLING 20 PIPE PRESSURE

FIELD OF THE INVENTION

The present invention generally relates to brake control equipment for a train. More particularly, the present invention pertains to an improved method of controlling the pressure within the independent application and release (IAR) pipe on the locomotive(s) of a train.

BACKGROUND OF THE INVENTION

A typical train includes one or more locomotives, a plurality of railcars and several trainlines. The trainlines include both pneumatic and electrical lines most of which run from the lead locomotive to the last railcar in the train. One pneumatic mainline is the brake pipe. The brake pipe consists of a series of individual pipe lengths each of which secured to the underside of one railcar. Each pipe length is interconnected to another such pipe length via a flexible coupler situated between each railcar. Usually controlled so as to mimic the pressure contained within a storage tank called the equalizing reservoir, the brake pipe is thus one long continuous pipe that runs from the lead locomotive to the last railcar. The brake pipe supplies the pressurized air that is required by the brake control system to charge the various reservoirs and operate the brake control valves of each railcar in the train.

In a locomotive, the pneumatic trainlines include an actuating pipe, a main reservoir equalizing (MRE) pipe, and an independent application and release (IAR) pipe, in addition to the brake pipe. Within a locomotive consist (i.e., two or more locomotives connected together), the MRE, actuating and IAR pipes of each locomotive connect to the MRE, actuating and IAR pipes of adjacent locomotives. Also known as the No. 20 pipe, or simply the 20 pipe, the IAR pipe supplies the compressed air that may be used to control the delivery of pressurized air to, and thus to operate, the brakes of each locomotive in the train.

The brakes of a train, whether on railcars or locomotives, are applied using brake cylinders and associated components.

During braking, the brake cylinders convert the pressurized air that they receive to mechanical force. From the brake cylinders this force is transmitted by mechanical linkage to the brake shoes. When the brakes are applied, it is the brake shoes that are ultimately used to slow or stop the rotation of the wheels on every vehicle in the train.

A typical locomotive has a brake control system such as any one of the various EPIC® Brake Equipment Systems produced by the Westinghouse Air Brake Company (WABCO). These brake control systems generally include a cab station unit, a keyboard, a display, a locomotive interface unit, a brake control computer and a pneumatic operating unit. The cab station unit generates various signals including those representing the positions of the automatic and independent brake handles, and conveys commands corresponding thereto to the brake control computer. The keyboard also permits a train operator to access the brake equipment, allowing, for example, the operator to input certain set-up parameters. The display allows the operation of the brake equipment to be monitored. The locomotive interface unit (LIU) connects electrical power and certain trainlines to the brake equipment and provides various signals to the brake control computer. Based on the inputs it receives and the software that dictates its operation, the brake control computer essentially controls the overall operation of the brakes. Shown in FIG. 1, the pneumatic operating unit (POU) controls the pressures in the pneumatic trainlines and in various reservoirs so as to control the brakes according to commands received from its brake control computer.

The POU features a pneumatic laminate to which the brake control computer and various pneumatically and electropneumatically operated devices mount. The design of the laminate allows these components to be removed for repair and maintenance without disturbing the piping or wiring of the locomotive. Through a number of ports and internal passages, the pneumatic laminate interconnects these devices to each other and to branch pipes that carry air from or to the actuating pipe, the MRE pipe, the IAR pipe, the brake pipe, the brake cylinder and/or various storage tanks such as the equalizing reservoir. It is through the ports and internal passages of the pneumatic laminate that these devices communicate fluidly with each other and the pneumatic pipes on the train.

Among the devices mounted to the laminate are the independent application and release (IAR) control portion, the brake cylinder (BC) control portion and the brake pipe (BP) control portion shown in FIG. 1. These operating portions of the POU are primarily controlled by the brake control computer.

Shown in FIG. 2, the IAR control portion features pneumatic logic circuitry along with solenoid operated valves by which the pressure in both the actuating and IAR pipes can be controlled. The BP control portion uses pneumatic logic circuitry and solenoid operated valves by which the pressure in the equalizing reservoir and brake pipe of the train can be controlled. The BP control portion also controls the emergency venting and brake pipe cut-off functions. The BC control portion features pneumatic logic circuitry along with solenoid operated valves by which the pressure in the brake cylinders on the locomotive can be controlled. The BC control portion controls the pressure in the locomotive brake cylinders in response to the commands generated by movement of the two brake handles. These automatic and independent brake demand signals may also be generated by pressure changes in the brake pipe, the IAR pipe, the back-up brake or the penalty brake circuitry.

The cab station unit generally includes a handle unit and a cab control unit. The handle unit houses the two brake handles and related components. The cab control unit essentially has a computer and a cab interface card. From the handle unit the cab control computer receives via the interface card the signals indicative of the positions of the automatic and independent brake handles. Based on these inputs, the cab control computer calculates commands representative of how much, or even if, the braking effort should he reduced. Along with other information, the cab control computer then conveys these commands to the brake control computer.

The automatic brake handle is the device that the train operator can manipulate to direct the brake equipment to apply and release the brakes on each locomotive and each railcar of the train. The level to which the brake equipment reduces or increases pressure within the brake pipe, and thus the amount of braking power exerted by the train brakes, corresponds to the position of the automatic brake handle. The independent brake handle, in contrast, allows the train operator to apply and release the brakes only on the locomotive(s) of the train.

The automatic brake handle can be moved from and in between a release position at one extreme in which brake pipe pressure is maximum and the brakes are completely released to an emergency position at another extreme in which brake pipe pressure is zero and the brakes are fully applied. When the brakes are applied, reduction of the pressure in the brake pipe is generally controlled from the lead locomotive via the BP control portion. The exact amount by which the pressure is reduced depends into which of the application positions the handle is placed. It is this reduction in pressure that signals the brake control valve(s) on each railcar to supply pressurized air from the appropriate reservoir(s) to the brake cylinders to apply the railcar brakes. The automatic brake handle positions thus include release, minimum service, full service, suppression, continuous service and emergency. Between the minimum and full service positions lies the service zone wherein each incremental movement of the handle toward the full service position causes an incremental reduction in brake pipe pressure.

The independent brake handle may be moved from a release position at one extreme to a full apply position at the other extreme and to any point within an application zone between those two extremes. As described in detail below, when the independent brake handle is placed within the release position, the brake control computer commands the IAR control portion to vent completely the air contained within a control reservoir, a loss of pressure that the IAR pipe, via the IAR control portion, attempts to match. The BC control portion pneumaticaliy responds to this loss ill IAR pipe pressure by venting air from the locomotive brake cylinders to release the locomotive brakes.

Conversely, when the independent brake handle is then moved into the application zone, the brake control computer commands the IAR control portion to increase proportionately the pressure within the control reservoir, an increase that the IAR pipe, via the IAR control portion, again attempts to match. The exact amount by which the control reservoir pressure is increased depends on how far into the application zone the handle is placed. For example, when the handle is placed into the full apply position, the brake control computer commands the IAR control portion to increase the control reservoir pressure to a nominal maximum value appropriate to the type of train at issue. Specifically, the IAR control portion fully charges the control reservoir to typically 45 psi (or other appropriate value), a level that the IAR pipe, via the IAR control portion, attempts to match. Though the pressure within the IAR pipe approaches close to that contained within the control reservoir, the IAR pipe cannot achieve it due to the mechanical nature of the IAR control portion. Responding pneumatically to the increase in IAR pipe pressure, the BC control portion directs air from the main reservoir to the brake cylinders to apply the locomotive brakes. The pressure in the IAR pipe and the locomotive brake cylinders thus reduces and increases in proportion to the position of the independent brake handle.

The keyboard allows the train operator to input the various parameters necessary to set-up the brake equipment for operation. Through the keyboard, the train operator can select the mode in which the locomotive brake equipment will be operated. In the LEAD CUT-IN mode, the brake control computer permits the locomotive operator to direct control of the train through both the automatic and the independent brake handles. This gives the operator control over the brakes of both the locomotive(s) and the railcars. In the LEAD CUT-OUT mode, the brake control computer permits the locomotive operator to direct control only through the independent brake handle. This gives the operator control over the brakes of the locomotive(s) only. In the TRAIL mode, both brake handles are rendered inoperable except for the emergency position. In a locomotive consist, the brake equipment of one locomotive operating in the TRAIL mode is essentially subservient to the brake equipment of another locomotive operating in either of the LEAD modes. The operation of the BP control portion is affected by the mode in which the locomotive is operated.

The foregoing background information is provided to assist the reader to understand the invention described and claimed below. Accordingly, any terms used herein are not intended to be limited to any particular narrow interpretation unless specifically stated otherwise in this document.

OBJECTIVES OF THE INVENTION

It is, therefore, a primary objective of the invention to provide an improved method of controlling the pressure within the IAR pipe of a train without requiring the use of additional hardware.

Another objective of the invention is control the pressure within the IAR pipe of a train in such a way as to eliminate reliance on a pressure differential developed across a diaphragm of a pneumatic valve as is common with currently known methods of controlling IAR pipe pressure.

Yet another objective of the invention is to modify the algorithm executed by the brake control computer so that the computer can use feedback of the actual IAR pipe pressure to control pressure within the IAR pipe better than currently known methods of controlling IAR pipe pressure.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the following drawings and claims.

SUMMARY OF THE INVENTION

The invention provides a method of controlling pressure within an IAR pipe of a train. The train is equipped with a brake handle, a control reservoir, an IAR control portion and a computer for controlling the IAR control portion generally according to position of the brake handle. In a presently preferred embodiment, the method comprises the steps of: moving the brake handle into an application zone when an increase in actual pressure in the IAR pipe is desired; and storing in the computer as a new setpoint the value desired for IAR pipe pressure. This new setpoint corresponds to the position that the brake handle occupies in the application zone. The method next includes the steps of: directing the computer to increase the actual pressure in the control reservoir to the new setpoint thereby causing the actual IAR pipe pressure to increase. As the actual IAR pipe pressure approaches the new setpoint, the computer is directed to adjust the actual control reservoir pressure to a value slightly above the new setpoint until the actual IAR pipe pressure reaches the new setpoint. Then, while monitoring the actual IAR pipe pressure, the computer is directed to adjust the actual control reservoir pressure to maintain the actual IAR pipe pressure at the new setpoint.

The method further comprises the steps of: moving the brake handle within the application zone toward the release position when a reduction in the actual IAR pipe pressure is desired; and storing in the computer as a desired new setpoint the value desired for IAR pipe pressure. This desired new setpoint corresponds to the point at which the handle lies in the application zone. The method next includes the steps of: directing the computer to reduce the actual control reservoir pressure to the desired new setpoint thereby causing the actual IAR pipe pressure to reduce. As the actual IAR pipe pressure approaches the desired new setpoint, the computer directs the actual control reservoir pressure to a value slightly below the desired new setpoint until the actual IAR pipe pressure reaches the desired new setpoint. Then, while monitoring the actual IAR pipe pressure, the computer is directed to adjust the actual control reservoir pressure to maintain the actual IAR pipe pressure at the desired new setpoint.

The method further comprises the steps of: moving the brake handle into the release position when desiring the actual IAP, pipe pressure to be reduced to zero; and storing in the computer as a setup setpoint the value of zero that is desired for IAR pipe pressure when the brake handle is placed into the release position. The method next includes the step of: directing the computer to reduce the actual control reservoir pressure equal to the setup setpoint thereby reducing the actual IAR pipe pressure to the setup setpoint of zero.

DETAILED DESCRIPTION OF THE INVENTION

Figure 1:
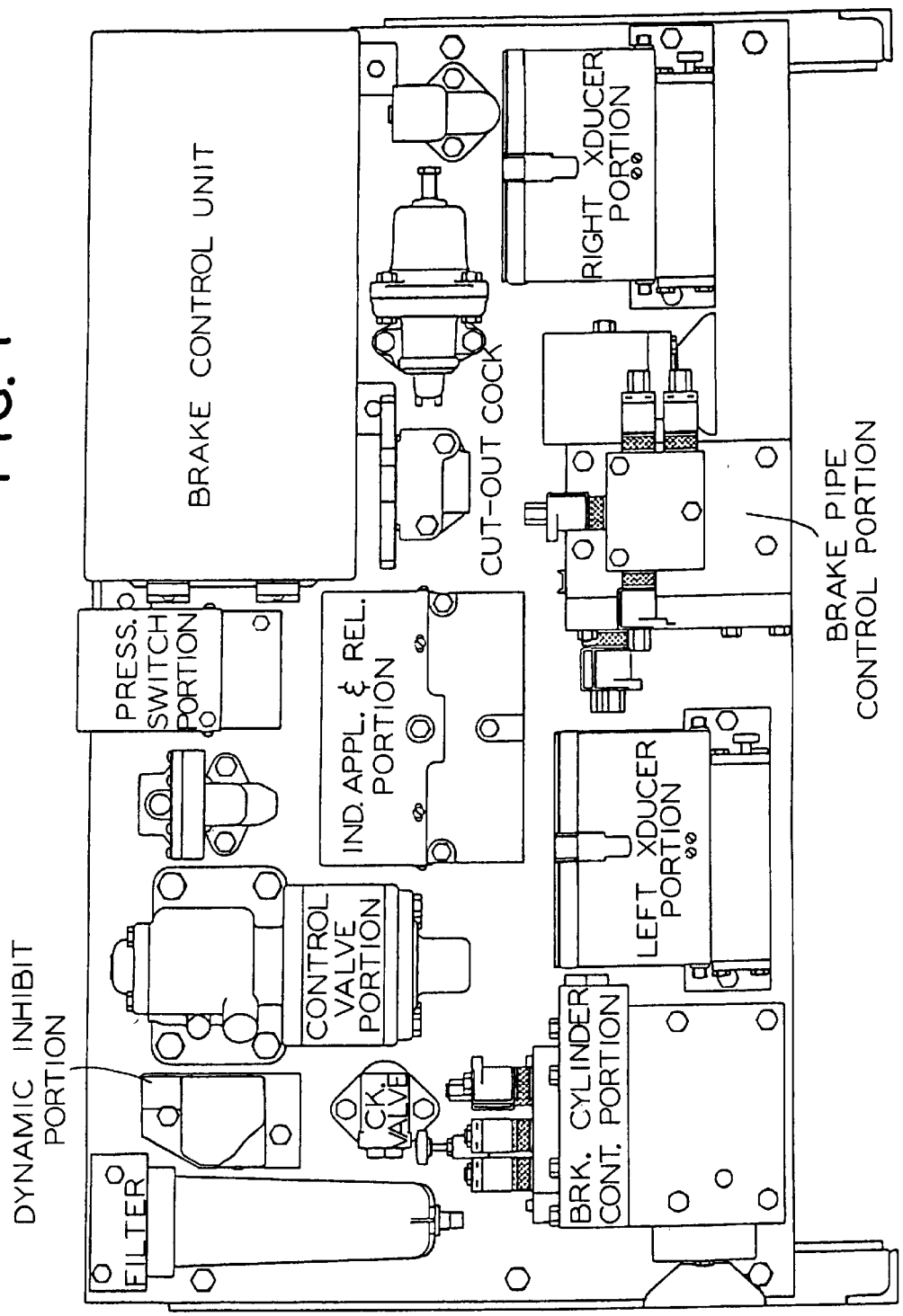
FIG. 1 is a front view of a pneumatic operating unit showing a brake control computer and a IAR control portion whose operation the brake control computer controls.

Before describing the invention in detail, the reader is advised that, for the sake of clarity and understanding, where possible identical components having identical functions have been marked with the same reference numerals in each of the Figures provided in this document.

Figure 2:
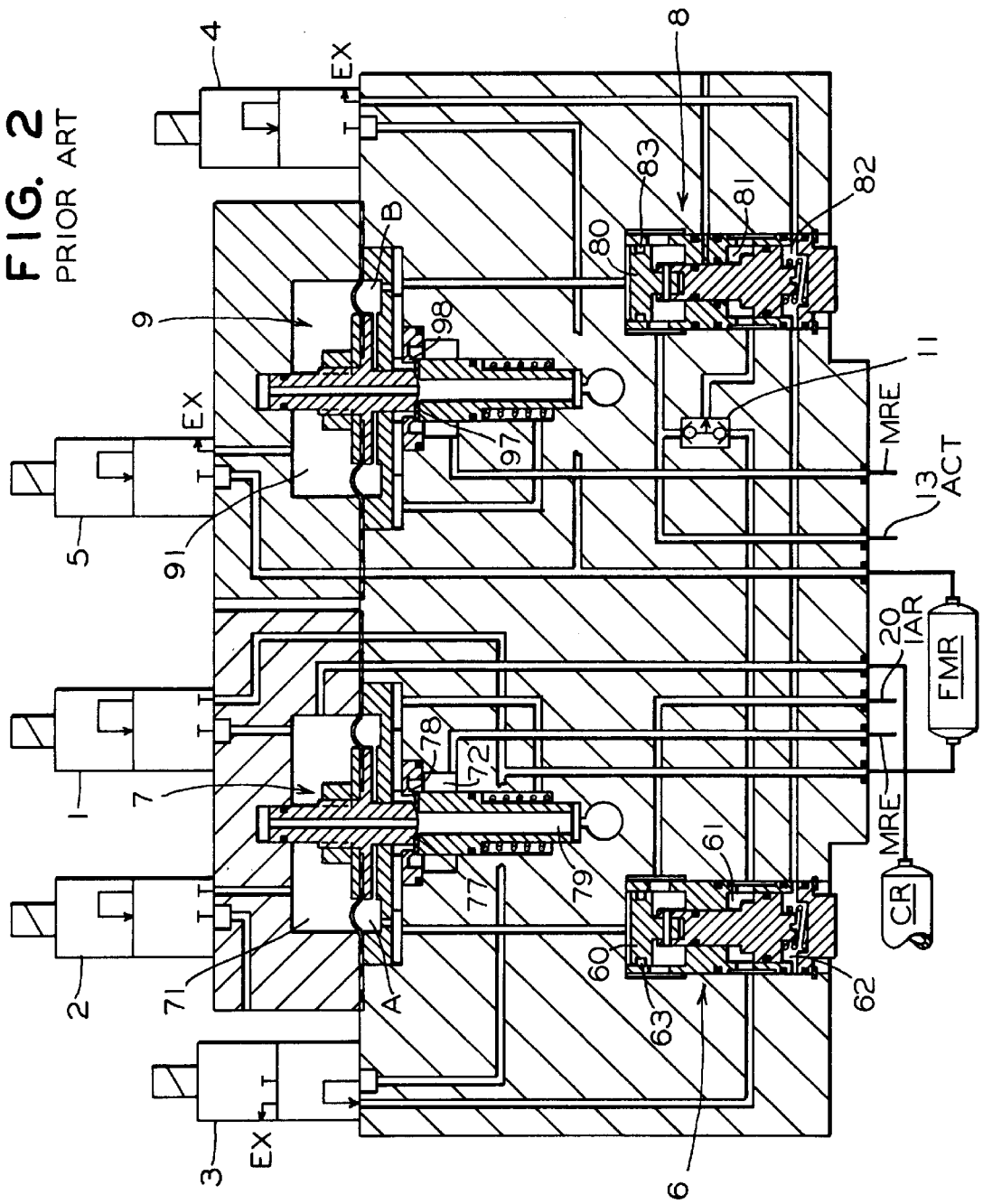
FIG. 2 is a cross sectional view of a prior art IAR control portion.

FIG. 2 illustrates an independent application and release (IAR) control portion of a pneumatic operating unit through which to control the pressure within the independent application and release (IAR) pipe on the locomotive(s) of a train. This IAR control portion is a known device whose construction and operation is shown and explained in Operation & Maintenance Manual Document No. 4208-32, Rev. Date August 1996, published by WABCO and incorporated herein by reference.

The IAR control portion typically employs five magnet valves and four pneumatic valves. The magnet valves include application and release magnet valves 1 and 2, lead and trail magnet valves 3 and 4 and a quick release magnet valve 5. The pneumatic valves include an IAR pipe cut-off valve 6, an IAR pipe regulating valve 7, an actuating pipe cut-off valve 8 and an actuating pipe regulating valve 9. The IAR pipe cut-off valve 6 features a bore within which a piston 60 can be to moved either a cut-in or cut-out position. Actuating pipe cut-off valve 8 likewise includes a piston 80 that can be switched between cut-in and cut-out positions. It is through actuating pipe cut-off and regulating valves 8 and 9, as controlled by magnet valves 3–5 that air is supplied to or vented from the actuating pipe. Similarly, through the IAR pipe cut-off and regulating valves 6 and 7, as controlled by magnet valves 1–4, air is supplied to or vented from the IAR pipe.

The IAR pipe and actuating pipe regulating valves 7 and 9 each feature a dual valve seat arrangement that allows these valves to assume any one of three operational states: release, apply and lap. Specifically, regulating valve 7 can be closed on a first seat 77, on a second seat 78 or both. Manipulated so that its first seat 77 is open while its second seat 78 is closed, regulating valve 7 assumes the release state. Manipulated so that its first seat 77 is closed while its second seat 78 is open, regulating valve 7 assumes the apply state. Manipulated so that its first and second seats are closed, IAR pipe regulating valve 7 assumes the lap state, as shown in FIG. 2. Having first and second seats 97 and 98 of its own, the actuating pipe regulating valve 9 can be manipulated in essentially the same way.

Among other internal pneumatic routes, the IAR control portion defines several passages as shown in FIG. 2. Best described in terms of networks, these passages include a first network, a second network and a control. network each of which described herein to the extent necessary to understand the invention. The control network is essentially a web of interconnected passages that is used to interconnect the magnet valves to a source of control pressure such as the filtered air supplied by the main reservoir (FMR) of the locomotive. The first network is used to Interconnect the IAR pipe to certain chambers of the IAR pipe cut-off and regulating valves 6 and 7. For example, when piston 60 is placed in the cut-in position, the intermediate chamber A and its associated passages (situated adjacent the underside of the diaphragm of regulating valve 7) communicate with the IAR pipe via an end chamber 63 of valve 6 and the first network. The second network is used to interconnect the actuating pipe (also referred to as the No. 13 pipe) to certain chambers of the actuating pipe cut-off and regulating valves 8 and 9. For example, when piston 80 is placed in the cut-in position, the intermediate chamber B and its associated passages (situated adjacent the underside of the diaphragm of regulating valve 9) communicate with the actuating pipe via an end chamber 83 of valve 8 and the second network. (As alluded to in the background section of this document, the IAR control portion itself does not directly connect to the named pneumatic pipes and reservoirs of the train. Only indirectly—through the ports and internal passages of the pneumatic laminate and various branch pipes leading thereto—does the IAR control portion communicate fluidly with the named pneumatic pipes and reservoirs.)

The aforementioned magnet valves are each two-position magnet valves controlled by either the brake control computer (not shown) or other known control components. The application magnet valve (AMV) 1 connects at its input port to the filtered main reservoir (FMR) via the control network and at its output port to a control reservoir (CR) chamber 71 located adjacent the topside of the diaphragm of regulating valve 7. The release magnet valve (RMV) 2 connects at its input port to the CR chamber 71 and at its exhaust port to atmosphere. The lead magnet valve (LMV) 3 connects at its input port to the control network and at its output port to opening chambers 61 and 81 of the IAR pipe and actuating pipe cut-off valves 6 and 8, respectively. The trail magnet valve (TMV) 4 connects at its input port to the control network and at its output port to closing chambers 82 and 62 of the actuating pipe and IAR pipe cut-off valves 8 and 6, respectively. The quick release magnet valve (QRMV) 5 connects at its input port to the FMR pipe via the control network and at its output port to a control reservoir (CR) chamber 91 located adjacent the topside of the diaphragm of actuating pipe regulating valve 9.

Regarding the operation of the IAR control portion when the train operator chooses to operate the locomotive in the LEAD mode, the brake control computer energizes the LMV 3 and deenergizes the TMV 4 to place the IAR pipe and actuating pipe cut-off valves 6 and 8 in their cut-in positions. Specifically, the TMV 4 in its deenergized state disconnects its input port from its output port thereby preventing air from the FMR pipe from flowing (via the control network) to the closing chambers 82 and 62 of the actuating pipe and IAR pipe cut-off valves 8 and 6. Meanwhile, the LMV 3 in its energized state allows FMR air (via the control network) to flow to the opening chamber 61 of IAR pipe cut-off valve 6. The resulting pressure built up in opening chamber 61 is normally sufficient to overcome the bias of valve 6 thereby forcing piston 60 downward so that valve 6 assumes the cut-in position (not shown). In its cut-in position, the IAR pipe cut-off valve 6 (via end chamber 63) allows intermediate chamber A to communicate (via the first network) with the IAR pipe.

As for the actuating pipe cut-off valve 8, when the LMV 3 is energized, air from the FMR pipe also flows through opening chamber 61 to a first inlet of double check valve 11, as shown in FIG. 2. Air from the actuating (No.13) pipe also flows freely (via the second network) to a second inlet of double check valve 11. Whichever of the FMR and No. 13 air streams exhibits the greater pressure, double check valve 11 directs the higher pressure air through its outlet to the opening chamber 81 of cut-off valve 8. The resulting pressure built up in opening chamber 81 is normally sufficient to overcome the bias of valve 8 thereby forcing piston 80 downward so that valve 8 assumes the cut-in position (not shown). In its cut-in position, the actuating pipe cut-off valve 8 (via end chamber 83) allows intermediate chamber B to communicate (via the second network) with the actuating (No. 13) pipe.

When the independent brake handle is moved to its release position, the brake control computer deenergizes both the APIV 1 and RMV 2. This causes the IAR pipe regulating valve 7 to assume the release state. The RMV 2 in its deenergized state connects its input port to its exhaust port thereby allowing air in the CR chamber 71 to escape to atmosphere. Meanwhile, the AMV 1 disconnects its input port from its output port thereby preventing FMR air (via the control network) from flowing into the CR chamber 71. Consequently, as pressure drops in CR chamber 71, the pressure drops in a control reservoir (not shown) to which the CR chamber 71 is connected. This pressure drop allows the diaphragm of valve 7 to rise upwardly thereby manipulating the IAR pipe regulating valve 7 to assume the release state (not shown). With its second seat 78 closed, valve 7 prevents air from the MRE pipe from flowing through supply chamber 72 into intermediate chamber A and its associated passages. Air from the main reservoir, therefore, cannot flow from the MRE pipe to the IAR pipe (via supply chamber 72, intermediate chamber A, end chamber 63 and the first network).

With its first seat 77 open, however, the IAR pipe regulating valve 7 does allow the pressure within the IAR pipe to vent to atmosphere. Specifically, as the locomotive is operating in the LEAD mode, the IAR pipe cut-off valve 6 is open thereby allowing the higher pressure air from the IAR pipe to flow (via the first network) through end chamber 63 into intermediate chamber A. Given the lack of pressure in the CR chamber 71 and the higher IAR pipe pressure impinging upon the underside of its diaphragm, the IAR pipe regulating valve 7 allows the air from the IAR pipe to continue flowing from intermediate chamber A past first seat 77 through exhaust chamber 79 to atmosphere. Pressure in the IAR pipe thus drops along with the pressure in the control reservoir, as long as RMV 2, being deenergized, connects the CR chamber 71 to atmosphere.

Responding pneumatically to the resulting drop in IAR pipe pressure, the BC control portion vents air from the brake cylinders of the locomotive to release the locomotive brakes. Brake cylinder pressure and IAR pipe pressure are monitored by the brake control computer via pressure transducers. The BC control portion can thus release the locomotive brakes by responding either pneumatically to the drop in IAR pipe pressure or electrically (via solenoid operated valves) to the ensuing commands issued by the brake control computer, or both.

When the independent brake handle is moved from the release position into the application zone, the computer energizes both the AMV 1 and the REV 2. This causes the IAR pipe regulating valve 7 to assume the apply state. The RMV 2 in its energized state disconnects its input port from its exhaust port thereby preventing air in the CR chamber 71 from escaping to atmosphere. Meanwhile, the AMV 1 in its energized state connects its input port to its output port thereby allowing FMR air via the control network to flow into the CR chamber 71. Consequently, as pressure builds in CR chamber 71, the pressure builds in the control reservoir (CR) to which the CR chamber 71 is connected. This pressure increase allows the diaphragm of valve 7 to move downwardly thereby manipulating the IAR pipe regulating valve 7 to assume the apply state (not shown). With its first seat 78 closed, valve 7 prevents air from the IAR pipe from flowing from intermediate chamber A and its associated passages to exhaust chamber 79. Air from the IAR pipe, therefore, cannot escape to atmosphere (via the first network, end chamber 63, intermediate chamber A, and exhaust chamber 79).

With its second seat 78 open, however, the IAR pipe regulating valve 7 does allow air from the main reservoir of the locomotive to charge the IAR pipe. Specifically, air from the MRE pipe is able to flow through supply chamber 72 past second seat 78 and into intermediate chamber A and its associated passages. As the locomotive is operating in the LEAD mode, the IAR pipe cut-off valve 6 is open thereby allowing the air from the MRE pipe to continue flowing through end chamber 63 and into the IAR pipe (via the first network). Pressure in the IAR pipe thus rises along with the pressure in the control reservoir CR, as long as the AMV 1 and RMV 2, being energized, allow the CR chamber 71 to be pressurized with FMR air.

Meanwhile, the brake control computer monitors the current pressure in the control reservoir via a pressure transducer. When the control reservoir pressure reaches the target level that corresponds to the position into which the independent brake handle has been placed, the computer deenergizes the AMV 1 while keeping the PMV 2 energized. Now as the pressure in the IAR pipe approaches that contained in the control reservoir, so does the pressure on the underside of the diaphragm approach that impinging upon the topside of the diaphragm of valve 7. Consequently, the regulating valve 7 now closes upon its second seat 78. Still closed upon its first seat 77, the regulating valve 7 thus assumes the lap state, as shown in FIG. 2. The IAR pipe regulating valve 7 cuts the IAR pipe off from both the MRE pipe and atmosphere thereby holding the control reservoir at the applicable target pressure.

Responding pneumatically to the resulting rise in IAR pipe pressure, the BC control portion directs air from the main reservoir of the locomotive to the brake cylinders so as to apply the locomotive brakes. Meanwhile, the pressure transducers provide electrical signals indicative of the current pressures in the control reservoir and IAR pipe to the brake control computer. Based in part on these signals, the brake control computer commands the solenoid operated valves of the BC control portion to direct air from the main reservoir to the locomotive brake cylinders. The BC control portion can thus apply the locomotive brakes by responding either pneumatically to the rise in IAR pipe pressure or electrically to the ensuing commands issued by the brake control computer, or both. The BC control portion can also assume a lap state in which the brake cylinder pressure can be maintained at the desired level.

Regarding the operation of the IAR control portion when the locomotive operator chooses to operate the locomotive in the TRAIL mode, the brake control computer deenergizes the LMV 3 and energizes the TMV 4 to place the IAR pipe and actuating pipe cut-off valves 6 and 8 in their cut-out positions. Specifically, the LMV 3 in its deenergized state disconnects its input port from its output port thereby preventing air from the FMR pipe from flowing (via the control network) to the opening chambers 61 and 81 of the IAR pipe and actuating pipe cut-off valves 6 and 8. Meanwhile, the TMV 4 in its energized state allows FNR air (via the control network) to flow to the closing chambers 82 and 62 of the actuating pipe and IAR pipe cut-off valves 8 and 6. The resulting pressure built up in closing chamber 62 is normally sufficient to overcome the bias of valve 6 thereby forcing piston 60 upward. IAR pipe cut-off valve 7 is thus manipulated to assume the cut-out position, as shown in FIG. 2, in which the IAR pipe is cut-off from intermediate chamber A. This, of course, prevents the IAR control portion from being used to charge or vent the IAR pipe.

Within a locomotive consist, one locomotive operated in the TRAIL mode is essentially subservient to another locomotive operated in the LEAD mode. The IAR control portion of the lead locomotive thus controls the pressure within the IAR pipe while the IAR control portion in each locomotive operated in the TRAIL mode is prevented from affecting the pressure within the IAR pipe. The operation of the IAR control portion is affected by the mode in which the locomotive is operated.

The construction and operation of the IAR control portion has been described herein to the extent necessary to understand the environment in which the present method invention will be used. It should be understood, however, that this constitutes a brief and simplified explanation of how this operating portion works. A more detailed explanation of the operation of the IAR control portion can be found in the aforementioned Operation & Maintenance Manual Document published by WABCO, previously incorporated herein by reference.

It is apparent that the foregoing is illustrative of a method of controlling IAR pipe pressure that relies upon development of a pressure differential across the diaphragm of IAR pipe regulating valve 7. Specifically, the IAR control portion and the brake control computer that controls it use the pressure in the control reservoir to control the pressure in the IAR pipe. As noted earlier, the nominal maximum value for pressure in the control reservoir (corresponding to a full application of the locomotive brakes) depends upon the type of train at issue. Consequently, when the independent brake handle is moved into the full apply position, the brake control computer energizes the AMV 1 and RMV 2 to bring the pressure in the control reservoir to this nominal maximum value. Conversely, when the handle is moved into the release position, the brake control computer deenergizes the AMV 1 and RMV 2 to bring the pressure in the control reservoir to zero. Moreover, when the handle is moved to any point in the application zone, the computer derives a new target pressure for the control reservoir that corresponds to handle position. The computer then operates the appropriate magnet valve(s) of the IAR control portion to bring the pressure in the control reservoir to the new target level. The pressure in the control reservoir is monitored via a transducer. The brake control computer then uses this feedback to maintain the control reservoir at the target pressure appropriate for the given handle position.

This target pressure, of course, is applied to the CR chamber 71 against the diaphragm of regulating valve 7 where it acts as a reference pressure for the IAR pipe. As noted previously, movement of the diaphragm allows the regulating valve 7 to assume any one of three states: (1) the release state in which the IAR pipe is vented to atmosphere, (2) the apply state in which main reservoir air is used to charge the IAR pipe, and (3) the lap state in which the IAR pipe is cut-off from both the MRE pipe and atmosphere thereby holding the control reservoir at the then applicable target pressure. The pressure in the IAR pipe always attempts to match the target pressure, but due to the mechanical nature of the IAR pipe regulating valve 7 cannot achieve it. Consequently, there is always a difference between the pressure in the control reservoir and that in the IAR pipe.

Figure 3A:
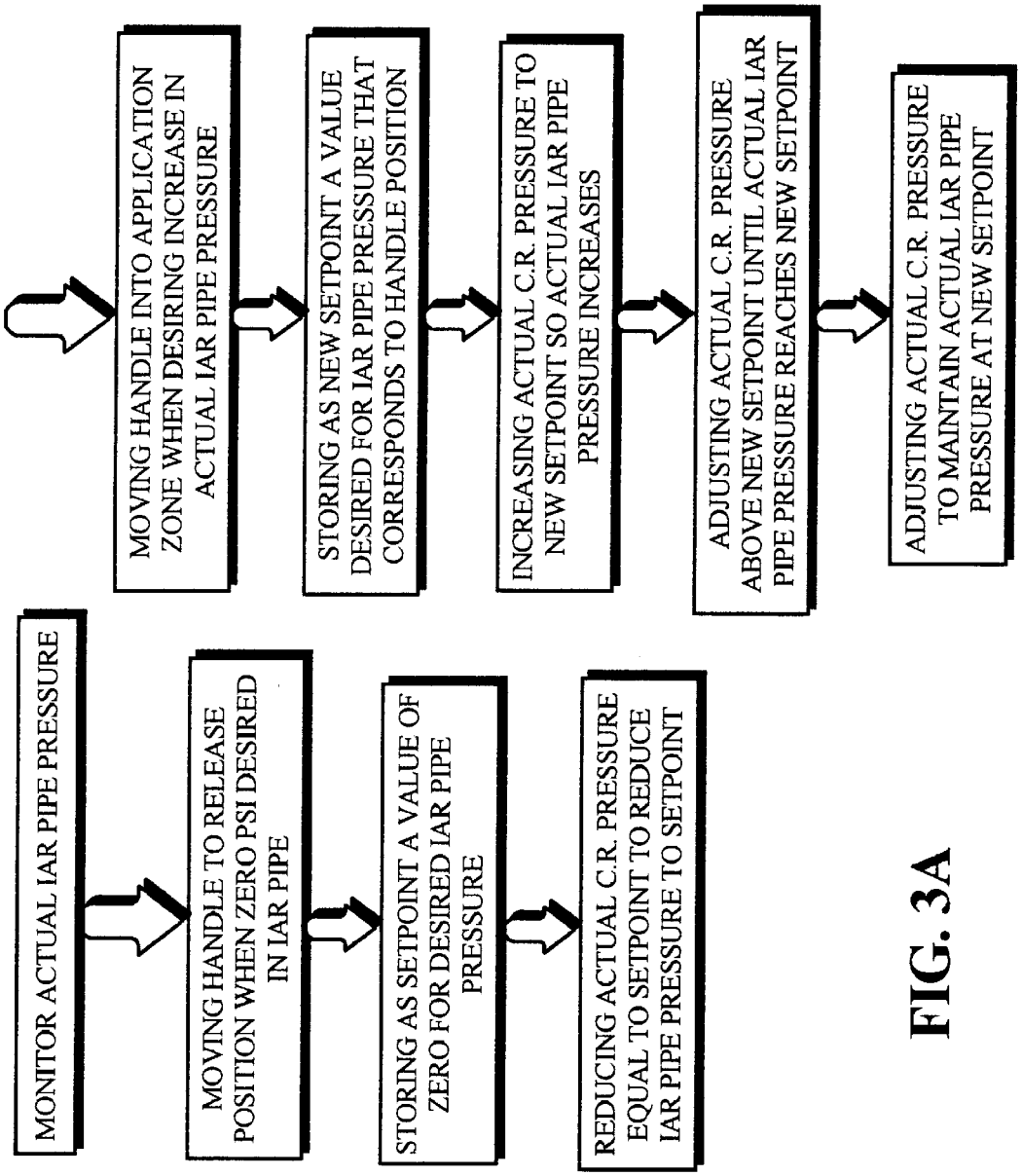
FIG. 3 is a block diagram that illustrates in step wise fashion, according to the present invention, an improved method for controlling IAR pipe pressure on a train.
Figure 3B:
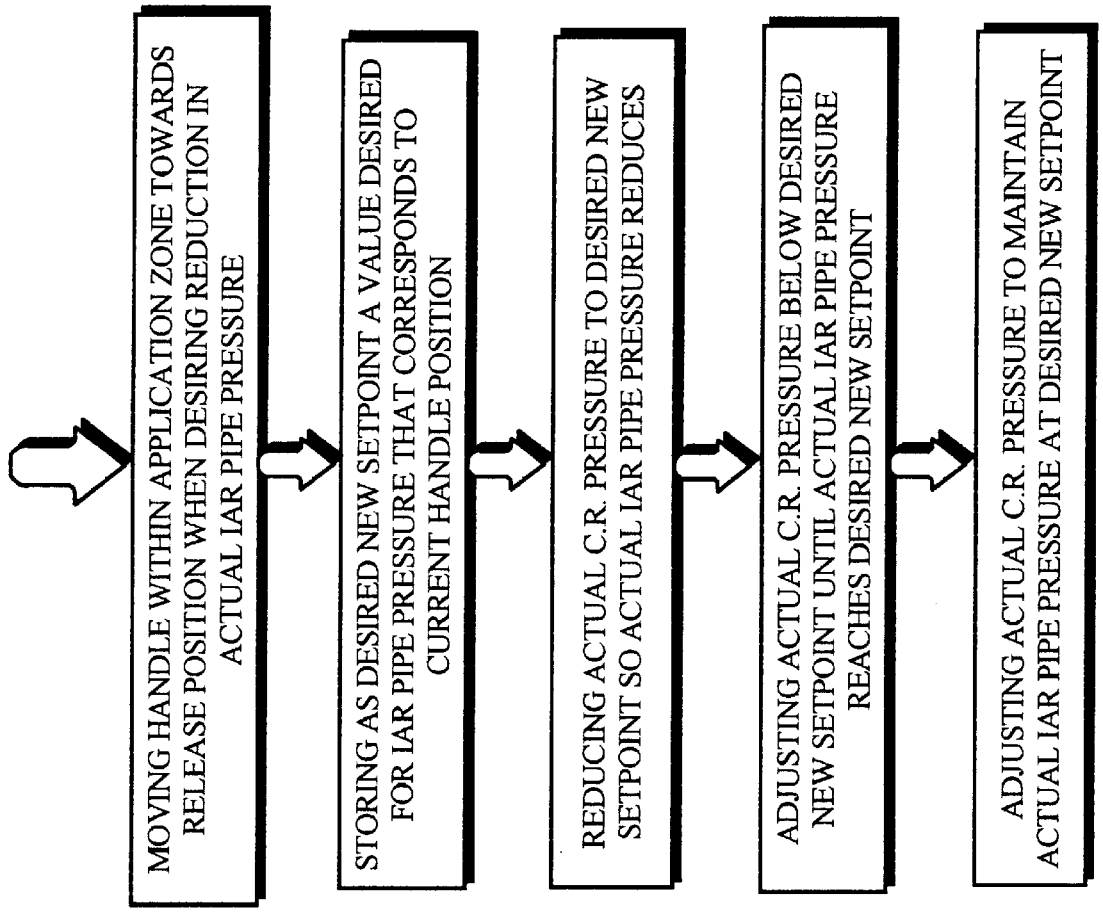

FIG. 3 illustrates an improved method for controlling IAR pipe pressure that can be employed with any of the aforementioned EPIC® Brake Equipment Systems. Referring to the IAR control portion described above, this new method eliminates reliance on developing the pressure differential across the diaphragm of the IAR pipe regulating valve 7 to control the pressure within the IAR pipe.

Comprised of several steps, the improved method of controlling IAR pipe pressure involves using the brake control computer and the IAR control portion under its control. It is understood that the brake control computer monitors the actual pressure within the IAR pipe via a pressure transducer.

When the independent brake handle is placed within the release position, the method includes the following steps all of which preferably performed in the order listed below. The computer is directed to store as a setpoint the value of zero. It is desired that the IAR pipe pressure be reduced to zero when the handle is placed into the release position. The computer is directed to command the IAR control portion to reduce the actual pressure in the control reservoir equal to the setpoint. This, of course, will cause the actual pressure in the IAR pipe to reduce, eventually, to the setpoint of zero.

Regarding movement of the independent brake handle into the application zone, the method includes the following steps all of which preferably performed in the order set forth below. The train operator moves the handle into the application zone when an increase in the actual IAR pipe pressure is desired. The computer is then directed to store as a new setpoint the value desired for the IAR pipe pressure. This new setpoint corresponds to the position that the independent brake handle occupies in the application zone. For example, should the handle be placed into the full apply position, the new setpoint would typically be 45 psi or other nominal maximum value suitable to the type of train at issue. The computer is then directed to command the IAR control portion to increase the actual control reservoir pressure to the new setpoint thereby causing the actual IAR pipe pressure to increase. As the actual IAR pipe pressure approaches the new setpoint, the computer is directed to command the IAR control portion to adjust the actual control reservoir pressure to a value slightly above the new setpoint until the actual pressure in the IAR pipe reaches the new setpoint. As it monitors the actual IAR pipe pressure, the computer is directed to command the IAR control portion to adjust the actual control reservoir pressure to maintain the actual pressure within the IAR pipe at the new setpoint.

Regarding movement of the independent brake handle back towards the release position, the method includes the following steps all of which preferably performed in the order listed below. The train operator moves the handle back towards the release position when a reduction in the actual IAR pipe pressure is desired. The computer is then directed to store as a desired new setpoint the value desired for the IAR pipe pressure. This desired new setpoint corresponds to the current point at which the independent brake handle lies in the application zone. The computer is then directed to command the IAR control portion to reduce the actual control reservoir pressure to the desired new setpoint thereby causing the actual IAR pipe pressure to reduce. As the actual IAR pipe pressure approaches the desired new setpoint, the computer is directed to command the IAR control portion to adjust the actual control reservoir pressure to a value slightly below the desired new setpoint until the actual IAR pipe pressure reaches the desired new setpoint. As it monitors the actual IAR pipe pressure, the computer is directed to command the IAR control portion to adjust the actual control reservoir pressure to maintain the actual pressure in the IAR pipe at the desired new setpoint.

Having now disclosed the invention, it is well within the abilities of one of ordinary skill in the brake control art to codify the improved method in the programming code of the brake control computer. Logic embodying the aforementioned steps need only be incorporated into the software algorithms and control modules involved in the monitoring and regulation of the pressures within the control reservoir and the IAR pipe. A brake control computer embodying this logic is capable of controlling the IAR control portion so as to implement the improved method of controlling IAR pipe pressure.

The presently preferred embodiment for carrying out the invention has now been set forth in detail according to the Patent Act. Those persons of ordinary skill in the art to which this invention pertains may nevertheless recognize various alternative ways of practicing the invention without departing from the spirit and scope of the following claims. Those of such skill will also recognize that the foregoing description is merely illustrative and not intended to limit any of the ensuing claims to any particular narrow interpretation.

Accordingly, to promote the progress of science and useful arts, we secure for ourselves by Letters Patent exclusive rights to all subject matter embraced by the following claims for the time prescribed by the Patent Act.

We claim:

1. A method of controlling pressure within an independent application and release (IAR) pipe of a locomotive, said locomotive equipped with a brake handle, a control reservoir, an IAR control device and a computer for controlling said IAR control device according to position of said brake handle, said method comprising the steps of:

(a) directing said computer to monitor actual pressure within said IAR pipe;

(b) moving said brake handle into a release position when desiring said actual pressure within said IAR pipe to be reduced to zero;

(c) storing in said computer as a setpoint a value of zero that is desired for pressure within said IAR pipe when said brake handle is placed into said release position;

(d) directing said computer to command said IAR control device to reduce actual pressure within said control reservoir equal to said setpoint thereby reducing said actual pressure within said IAR pipe to said setpoint;

(e) moving said brake handle into an application zone when an increase in said actual pressure within said IAR pipe is desired;

(f) storing in said computer as a new setpoint a value desired for said pressure within said IAR pipe that corresponds to a point at which said brake handle lies in said application zone;

(g) directing said computer to command said IAR control device to increase said actual pressure within said control reservoir to said new setpoint thereby causing said actual pressure within said IAR pipe to increase;

(h) directing said computer, as said actual pressure within sated IAR pipe approaches said new setpoint, to command said IAR control device to adjust said actual pressure within said control reservoir to a value slightly above said new setpoint until said actual pressure within said IAR pipe reaches said new setpoint;

(i) directing, as said computer monitors said actual pressure within said IAR pipe, said computer to command said IAR control device to adjust said actual pressure within said control reservoir to maintain said actual pressure within said IAR pipe at said new setpoint;

(j) moving said brake handle within said application zone toward said release position when a reduction in said actual pressure within said IAR pipe is desired;

(k) storing in said computer as a desired new setpoint a value desired for said pressure within said IAR pipe that corresponds to a current point at which said brake handle lies in said application zone;

(l) directing said computer to command said IAR control device to reduce said actual pressure within said control reservoir to said desired new setpoint thereby causing said actual pressure within said IAR pipe to reduce;

(m) directing said computer, as said actual pressure within said IAR pipe approaches said desired new setpoint, to command said IAR control device to adjust said actual pressure within said control reservoir to a value slightly below said desired new setpoint until said actual pressure within said IAR pipe reaches said desired new setpoint; and (n) directing, as said computer monitors said actual pressure within said IAR pipe, said computer to command said IAR control device to adjust said actual pressure within said control reservoir to maintain said actual pressure within said IAR pipe at said desired new setpoint.

2. The method of controlling pressure as recited in claim 1 wherein said computer monitors said actual pressure within said IAR pipe via a transducer.

3. The method of controlling pressure as recited in claim 1 wherein said computer monitors said actual pressure within said control reservoir via a transducer.

4. The method of controlling pressure as recited in claim 1 wherein said method is implemented by upgrading the programming code executed by said computer to accommodate said steps of said method.

5. The method of controlling pressure as recited in claim 1 wherein said new setpoint for said pressure within said IAR pipe is typically about 45 psi when said brake handle is moved into a fully applied position within said application zone.

6. A method of controlling pressure within an independent application and release (IAR) pipe of a locomotive, said method comprising the steps of:

(a) directing a computer to monitor actual pressure within said IAR pipe;

(b) moving a brake handle into a release position when desiring said actual pressure within said IAR pipe to be reduced to zero;

(c) storing in said computer as a setpoint a value of zero that is desired for pressure within said IAR pipe when said brake handle is placed into said release position;

(d) directing said computer to reduce actual pressure within a control reservoir equal to said setpoint thereby reducing said actual pressure within said IAR pipe to said setpoint;

(e) moving said brake handle into an application zone when an increase in said actual pressure within said IAR pipe is desired;

(f) storing in said computer as a new setpoint a value desired for said pressure within said IAR pipe that corresponds to a point at which said brake handle lies in said application zone;

(g) directing said computer to increase said actual pressure within said control reservoir to said new setpoint thereby causing said actual pressure within said IAR pipe to increase;

(h) directing said computer, as said actual pressure within said IAR pipe approaches said new setpoint, to adjust said actual pressure within said control reservoir to a value slightly above said new setpoint until said actual pressure within said IAR pipe reaches said new setpoint;

(i) directing, as said computer monitors said actual pressure within said IAR pipe, said computer to adjust said actual pressure within said control reservoir to maintain said actual pressure within said IAR pipe at said new setpoint;

(j) moving said brake handle within said application zone toward said release position when a reduction in said actual pressure within said IAR pipe is desired;

(k) storing in said computer as a desired new setpoint a value desired for said pressure within said IAR pipe that corresponds to a current point at which said brake handle lies in said application zone;

(l) directing said computer to reduce said actual pressure within said control reservoir to said desired new setpoint thereby causing said actual pressure within said IAR pipe to reduce;

(m) directing said computer, as said actual pressure within said IAR pipe approaches said desired new setpoint, to adjust said actual pressure within said control reservoir to a value slightly below said desired new setpoint until said actual pressure within said IAR pipe reaches said desired new setpoint; and (n) directing, as said computer monitors said actual pressure within said IAR pipe, said computer to adjust said actual pressure within said control reservoir to maintain said actual pressure within said IAR pipe at said desired new setpoint.

7. The method of controlling pressure as recited in claim 6 wherein said computer monitors said actual pressure within said IAR pipe via a transducer.

8. The method of controlling pressure as recited in claim 6 wherein said computer monitors said actual pressure within said control reservoir via a transducer.

9. The method of controlling pressure as recited in claim 6 wherein said method is implemented by upgrading the programming code executed by said computer to accommodate said steps of said method.

10. The method of controlling pressure as recited in claim 6 wherein said new setpoint for said pressure within said IAR pipe is typically about 45 psi when said brake handle is moved into a fully applied position within said application zone.

11. The method of controlling pressure as recited in claim 6 wherein said computer controls said actual pressure within said control reservoir via an IAR control device according to movement of said brake handle.

12. A method of controlling pressure within an independent application and release (IAR) pipe of a locomotive, said method comprising the steps of:

(a) moving a brake handle into an application zone when an increase in actual pressure within said IAR pipe is desired;

(b) storing in a computer as a new setpoint a value desired for pressure within said IAR pipe that corresponds to a point at which said brake handle lies in said application zone;

(c) directing said computer to increase actual pressure within a control reservoir to said new setpoint thereby causing said actual pressure within said IAR pipe to increase;

(d) directing said computer, as said actual pressure within said IAR pipe approaches said new setpoint, to adjust said actual pressure within said control reservoir to a value slightly above said new setpoint until said actual pressure within said IAR pipe reaches said new setpoint;

(e) directing, as said computer monitors said actual pressure within said IAR pipe, said computer to adjust said actual pressure within said control reservoir to maintain said actual pressure within said IAR pipe at said new setpoint;

(f) moving said brake handle within said application zone toward a release position for said brake handle when a reduction in said actual pressure within said IAR pipe is desired;

(g) storing in said computer as a desired new setpoint a value desired for said pressure within said IAR pipe that corresponds to a current point at which said brake handle lies in said application zone;

(h) directing said computer to reduce said actual pressure within said control reservoir to said desired new setpoint thereby causing said actual pressure within said IAR pipe to reduce;

(i) directing said computer, as said actual pressure within said IAR pipe approaches said desired new setpoint, to adjust said actual pressure within said control reservoir to a value slightly below said desired new setpoint until said actual pressure within said IAR pipe reaches said desired new setpoint; and (j) directing, as said computer monitors said actual pressure within said IAR pipe, said computer to adjust said actual pressure within said control reservoir to maintain said actual pressure within said IAR pipe at said desired new setpoint.

13. The method of controlling pressure as recited in claim 12 wherein said new setpoint for said pressure within said IAR pipe is typically about 45 psi when said brake handle is moved into a fully applied position within said application zone.

14. The method of controlling pressure as recited in claim 12 wherein said computer controls said actual pressure within said control reservoir via an IAR control device according to movement of said brake handle.

15. The method of controlling pressure as recited in claim 12 wherein said computer monitors at least one of said actual pressure within said IAR pipe and said actual pressure within said control reservoir.

16. The method of controlling pressure as recited in claim 12 further including the steps of:
   (a) moving said brake handle into said release position when desiring said actual pressure within said IAR pipe to be reduced to zero;
   (b) storing in said computer as a setup setpoint a value of zero that is desired for said pressure within said IAR pipe when said brake handle is placed in said release position; and
   (c) directing said computer to reduce said actual pressure within said control reservoir equal to said setup setpoint thereby reducing said actual pressure within said IAR pipe to said setup setpoint.

17. The method of controlling pressure as recited in claim 16 wherein said new setpoint for said pressure within said IAR pipe is typically about 45 psi when said brake handle is moved into a fully applied position within said application zone.

18. The method of controlling pressure as recited in claim 16 wherein said computer controls said actual pressure within said control reservoir via an IAR control device according to movement of said brake handle.

19. The method of controlling pressure as recited in claim 16 wherein said computer monitors at least one of said actual pressure within said IAR pipe and said actual pressure within said control reservoir.

* * * * *